United States Patent
Feng

(10) Patent No.: US 9,545,749 B2
(45) Date of Patent: Jan. 17, 2017

(54) ASSISTIVE POURING DEVICE FOR PEOPLE WITH ARTHRITIS AND OTHERS

(71) Applicant: Jeff Feng, Sugar Land, TX (US)

(72) Inventor: Jeff Feng, Sugar Land, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 0 days.

(21) Appl. No.: 14/641,627

(22) Filed: Mar. 9, 2015

(65) Prior Publication Data

US 2015/0252939 A1    Sep. 10, 2015

Related U.S. Application Data

(60) Provisional application No. 61/949,542, filed on Mar. 7, 2014.

(51) Int. Cl.
| | |
|---|---|
| *A47J 47/16* | (2006.01) |
| *B29C 51/00* | (2006.01) |
| *F16B 47/00* | (2006.01) |
| *B29C 47/00* | (2006.01) |
| *A47J 36/34* | (2006.01) |

(52) U.S. Cl.
CPC .............. *B29C 51/002* (2013.01); *A47J 36/34* (2013.01); *A47J 47/16* (2013.01); *B29C 47/0004* (2013.01); *F16B 47/00* (2013.01)

(58) Field of Classification Search
USPC ....................................................... 248/143
See application file for complete search history.

(56) References Cited

U.S. PATENT DOCUMENTS

| | | | | |
|---|---|---|---|---|
| 411,229 A | * | 9/1889 | Stevenson .............. | B65G 65/24 248/143 |
| 480,095 A | * | 8/1892 | Holme ................... | B65G 65/24 248/133 |
| 1,048,493 A | * | 12/1912 | Catlin ................... | B65G 65/24 248/143 |
| 1,187,017 A | * | 6/1916 | Snow .................... | B65G 65/24 248/143 |

(Continued)

FOREIGN PATENT DOCUMENTS

| | | |
|---|---|---|
| CA | 1121772 A | 4/1982 |
| WO | WO-2011071421 A3 | 8/2011 |

OTHER PUBLICATIONS

Design Patent Application for Assistive Pouring Device for People with Arthritis and Others, U.S. Appl. No. 29/497,214, filed Jul. 22, 2014.

*Primary Examiner* — Monica Millner
(74) *Attorney, Agent, or Firm* — Winstead PC

(57) ABSTRACT

An assistive pouring device may aid a user in handling and pouring liquids from a container. An assistive pouring device may provide an open platform with at least one surface suitable for receiving the container. The platform may provide a base surface for supporting the weight of the container, and may optionally provide lateral surface that prevents or minimizes shifting of the container from side to side. One or more of the platform surfaces may be made from or coated with a material that is slip-resistant or tacky. One or more of the platform surfaces may provide a textured surface. One or more roller legs are connected to the platform, which allow the assistive pouring device to be easily rolled or tilted to pour liquids from a container.

21 Claims, 4 Drawing Sheets

(56) References Cited

U.S. PATENT DOCUMENTS

| | | | | |
|---|---|---|---|---|
| 1,621,252 A | * | 3/1927 | Hillyard | A47G 19/12 222/463 |
| 1,633,083 A | * | 6/1927 | Fite, Jr. | A61J 9/06 211/74 |
| 1,716,281 A | * | 6/1929 | Pavey | B65G 65/24 248/143 |
| 1,829,353 A | * | 10/1931 | Hogan | B67D 3/0029 248/105 |
| 3,056,534 A | * | 10/1962 | Kasper, Sr. | A47G 23/0258 220/742 |
| 4,003,503 A | * | 1/1977 | Aldridge | B65D 47/06 222/173 |
| 4,150,806 A | * | 4/1979 | Dziuk | A47G 23/0241 224/275 |
| D256,418 S | * | 8/1980 | Corbett | D7/622 |
| 4,278,225 A | * | 7/1981 | Phelps | A61J 1/06 248/311.3 |
| 4,379,578 A | * | 4/1983 | Schuler | B65D 23/106 215/396 |
| 4,452,369 A | | 6/1984 | Rhodes | |
| 4,858,359 A | * | 8/1989 | Danz | F41A 23/02 42/94 |
| 4,874,142 A | * | 10/1989 | Gelatt | A45D 20/12 248/185.1 |
| D306,544 S | * | 3/1990 | Anderson | D7/620 |
| 4,974,800 A | * | 12/1990 | Tyson, Jr. | F17C 13/084 248/143 |
| D332,240 S | * | 1/1993 | Schlanger | D12/411 |
| 5,246,195 A | * | 9/1993 | Huff | A47J 47/16 248/309.1 |
| D343,094 S | * | 1/1994 | Varney | D7/622 |
| 5,320,319 A | * | 6/1994 | Winger | A47G 7/044 248/312.1 |
| D350,069 S | * | 8/1994 | Quarberg | 294/33 |
| D355,510 S | * | 2/1995 | Duncan | D30/119 |
| D361,131 S | * | 8/1995 | Leopold | D24/199 |
| 5,624,043 A | * | 4/1997 | Baptista | A47G 23/0241 211/60.1 |
| 5,758,853 A | * | 6/1998 | Perrin | A47K 5/12 248/311.2 |
| 5,887,830 A | * | 3/1999 | Liang | A47G 21/145 211/70.7 |
| 6,386,393 B1 | * | 5/2002 | Paulovich | B67D 3/0083 211/80 |
| 6,543,825 B1 | | 4/2003 | Dragutin | |
| D489,262 S | * | 5/2004 | Belton | D9/455 |
| 6,808,149 B1 | * | 10/2004 | Sendowski | A47K 5/13 211/75 |
| 6,945,434 B1 | * | 9/2005 | Dionne | B65D 23/001 222/186 |
| 6,979,031 B2 | * | 12/2005 | Coppotelli | A47G 23/0258 16/425 |
| 7,562,853 B2 | * | 7/2009 | Mazzola | A47G 7/044 248/311.2 |
| 7,845,506 B2 | * | 12/2010 | Willows | B65D 25/22 119/477 |
| D640,386 S | * | 6/2011 | Rhoades | D24/199 |
| 8,636,319 B1 | * | 1/2014 | Parker, Jr. | A47C 7/62 248/311.2 |
| 9,033,212 B2 | * | 5/2015 | Fuchs | B65D 31/06 229/122.23 |
| 2004/0262459 A1 | * | 12/2004 | Qualiano | A47J 47/16 248/37.6 |
| 2005/0263542 A1 | * | 12/2005 | Brezden | B65G 65/24 222/166 |
| 2007/0295768 A1 | | 12/2007 | Gringer et al. | |
| 2008/0012368 A1 | * | 1/2008 | Kent-Fawkes | A47G 23/0258 294/29 |
| 2010/0239407 A1 | * | 9/2010 | Mills | A47G 19/10 414/800 |
| 2012/0170194 A1 | * | 7/2012 | Lord | G06F 1/1632 361/679.02 |
| 2012/0211394 A1 | | 8/2012 | Hatcher | |
| 2013/0140413 A1 | * | 6/2013 | Bailey | F16M 11/08 248/201 |

\* cited by examiner

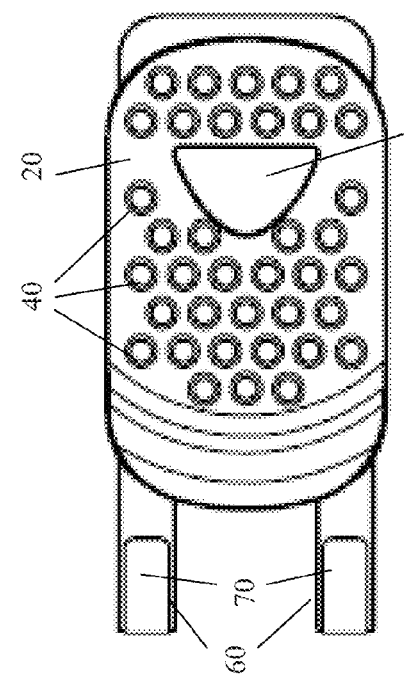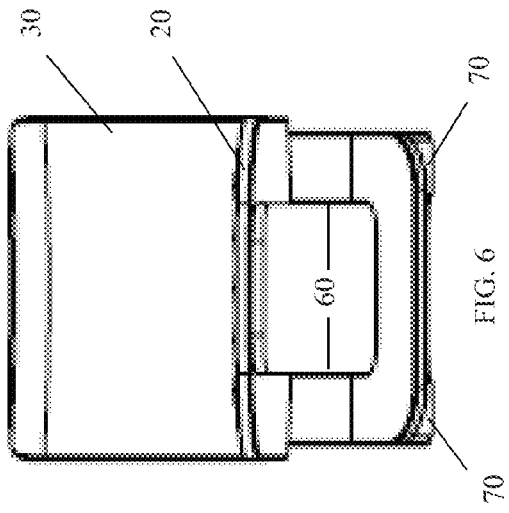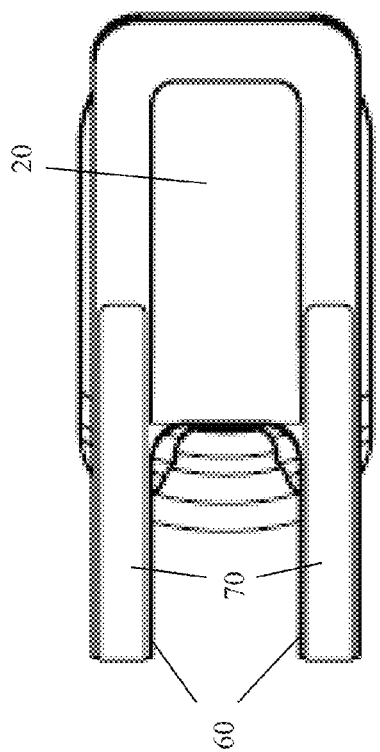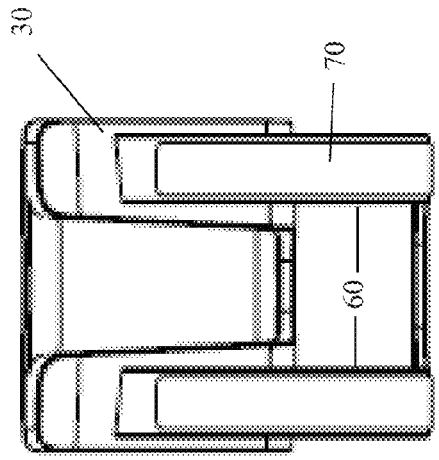

ASSISTIVE POURING DEVICE FOR PEOPLE WITH ARTHRITIS AND OTHERS

RELATED APPLICATIONS

This application claims the benefit of U.S. Provisional Patent Application No. 61/949,542, filed on Mar. 7, 2014, which is incorporated herein by reference.

FIELD OF THE INVENTION

This invention relates to assistive pouring systems and methods. More particularly, to an assistive pouring device that aids pouring liquids out of containers.

BACKGROUND OF INVENTION

Certain individuals may have difficulty pouring liquids from containers, such as jars, bottles, pitchers, bowls, or the like. Such individuals may have difficulty handling containers that exert significant force and/or torque on their forearms, hands or fingers. For example, a person suffering from arthritis may find it difficult to pour liquids from a heavy container, such as a milk jug. Existing devices to assist with pouring liquids from containers are designed for specific containers, and are not suitable for use with a variety of containers that are different in shape and/or size.

An assistive pouring device is discussed herein that aids a user in pouring liquids from containers. The device may provide an open platform with surface that is suitable for receiving a wide range of containers of different size and/or shape. The platform provides a surface that may securely retain the container. Roller legs extending from the open platform allow the device to be rolled with little effort in a controlled manner.

SUMMARY OF THE INVENTION

In one embodiment, an assistive pouring device may provide an open platform with at least one surface suitable for receiving a container. The platform may provide a base surface for supporting the weight of the container. In some embodiments, the platform may also optionally provide lateral surface that prevents or minimizes shifting of the container from side to side or forwards and backwards on the base surface. One or more of the platform surfaces may optionally be made from or coated with a material that is slip-resistant or tacky. In some embodiments, one or more of the platform surfaces may optionally provide a textured surface. One or more roller legs are connected to the platform, which allow the assistive pouring device to be easily rolled or tilted. In some embodiments, the roller legs may be curved with a large radius of curvature. In some embodiments, one or more roller legs may provide a bottom portion that is coated with a slip-resistant or tacky surface.

In some embodiments, an assistive pouring device may be formed from polymers, plastics, polystyrene, polyvinyl chloride, wood, wood laminate, carbon fiber, aluminum, or the like. In some embodiments, one or more slip-resistance surfaces on the assistive pouring device may be formed from silicon, rubber, latex, polymers, elastomers, or the like.

The foregoing has outlined rather broadly various features of the present disclosure in order that the detailed description that follows may be better understood. Additional features and advantages of the disclosure will be described hereinafter.

DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIG. 3 shows a bottom view of an illustrative embodiment of an assistive pouring device;

FIG. 4 shows a top view of an illustrative embodiment of an assistive pouring device;

FIG. 5 shows a rear view of an illustrative embodiment of an assistive pouring device;

FIG. 6 shows a front view of an illustrative embodiment of an assistive pouring device;

DETAILED DESCRIPTION

Figure 1:
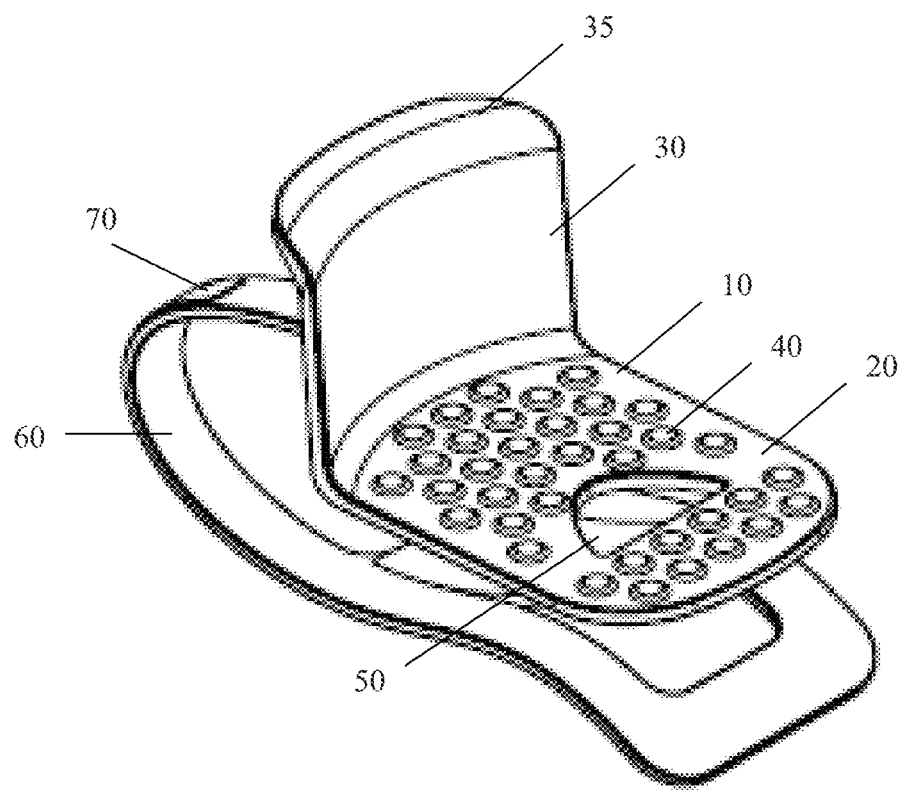
FIG. 1 shows a isometric view of an illustrative embodiment of an assistive pouring device.
Figure 2:
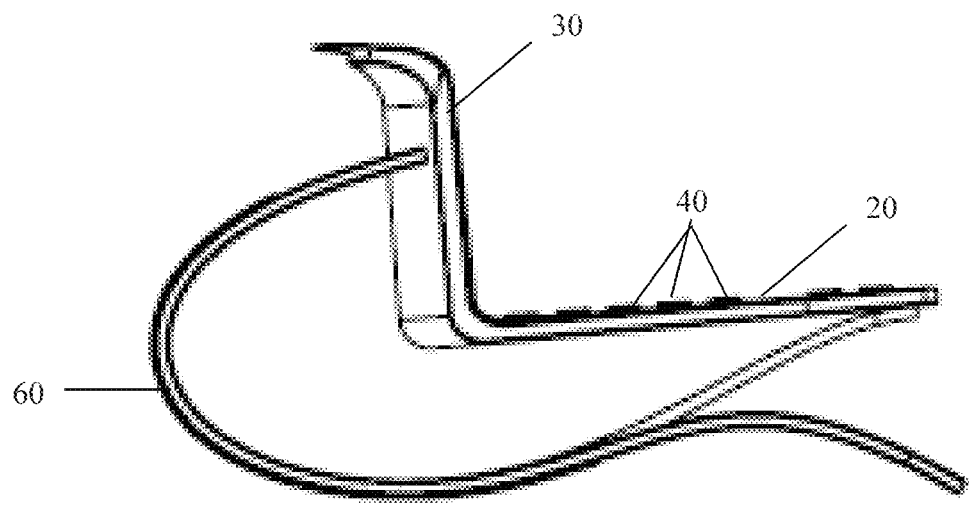
FIG. 2 shows a side view of an illustrative embodiment of an assistive pouring device.

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

FIGS. 1-6 show various views of an illustrative embodiment of an assistive pouring device. Platform 10 provides an open area for receiving a container. Platform 10 provides an open design that allows it to receive a wide variety of containers of different sizes and shapes, which makes the device adaptable for use with a variety of containers. Notably, platform 10 does not require a user to strap or tie down a container to properly secure the container, in contrast to other devices. This aids in making the assistive pouring device easy to use, as some user may have difficulty operating straps or tie down mechanisms. Platform 10 provides one or more surfaces 20, 30 that support, prevent, and/or minimize shifting of the container when properly positioned in the platform.

The platform 10 may provide a base surface 20 for supporting the weight of the container. In some embodiments, the base surface 20 is approximately horizontal. In some embodiments, the platform 10 may also provide a lateral or vertical surface 30. In some embodiments that include a lateral surface 30, base surface 20 may be slightly tilted up from a horizontal plane towards lateral surface 30. In other words, an end of base surface 20 furthest away from lateral surface 30 may be raised slightly higher than that the rest of the base surface, which promotes the container's weight being support by both the base surface 20, and to a lesser degree, the lateral surface 30. As a nonlimiting example, base surface 20 may be tilted from a horizontal plane at an angle equal to or between about 1° to 10°. As another nonlimiting example, an end of base surface 20 furthest away from lateral surface 30 may be raised equal to or between about 20 mm to 30 mm higher than the opposite end of the base surface. In some embodiments, the base surface 20 may be substantially planar. In other embodiments, the base surface 20 may be contoured. For example, the base surface 20 may be contoured to be concave, concave with a flat bottom, or the like. Base surface 20 may made from or coated with a material that is slip-resistant or tacky to prevent or minimize movement of a container placed on the assistive pouring device. For example, the base surface 20 may be silicon, rubber, latex, polymeric, elastomeric, or the like. In some embodiments, base surface 20 may provide a textured surface with anti-slip features 40 to increase the slip-resistance of the surface. As a nonlimiting example, the base surface may provide anti-slip features 40, such as one or more suction cups, grooves, aggressive textures, or the like. Aggressive textures on a surface may be any texture that increase friction with a container in comparison to a substantially flat surface. The aggressive textures may prevent or minimize slipping or shifting of the container placed on the surface. In some embodiments, base surface 20 may optionally provide an opening 50. Opening 50 allows for angled placement of a container on the platform 10. For example, a portion of a container, such as a bottom corner of the container, may be positioned in opening 50, and another portion of the container may rest against lateral surface 30. In some embodiments, the opening 50 may be approximately triangular in shape, and the triangle may be positioned so that one side is approximately parallel to the lateral surface 30. In other embodiments, the opening 50 may be any suitable shape, such as, but not limited to ovular, circular, elliptical, or the like.

As discussed previously, the platform 10 may provide lateral surface 30, which may be coupled to an end of the base surface 20. Lateral surface 30 may prevent or minimize shifting of the container from side-to-side and/or forwards and backwards relative to the base surface 20. In some embodiments, the lateral surface 30 is approximately vertical. In some embodiments, lateral surface 30 may be slightly tilted from a vertical plane. For example, an end of lateral surface 30 furthest away from base surface 20 may be tilted slightly away from the base surface at an angle equal to or between about 1° to 10°. In some embodiments, the lateral surface 30 may be contoured to receive a wide variety of containers. For example, the lateral surface 30 may be contoured to be concave or the like, which may especially aid in receiving containers that are round or oval shaped. In other embodiments, the lateral surface 30 may be substantially planar. Additionally, in some embodiments, lateral surface 30 may provide a lip 35 near the top of the lateral surface, which may be horizontal or angled. Lip 35 may receive the side of a container when opening 50 it utilized for angled placement of the container. For example, when a container is nearly empty, it may be desirable to position the container in opening 50 to allow for increased tilting in comparison to placing the container flat on the base surface 20. Lateral surface 30 may made from or coated with a material that is slip-resistant or tacky to prevent or minimize movement of a container placed in the assistive pouring device. For example, the lateral surface 30 may be silicon, rubber, latex, polymeric, elastomeric, or the like. In some embodiments, lateral surface 30 may provide a textured surface with anti-slip features (not shown) to increase the slip-resistance of the surface. As a nonlimiting example, the lateral surface 30 may provide one or more anti-slip features, such as suction cups, grooves, aggressive textures, or the like. In embodiments utilizing surfaces with suction cups, a user may engage a container by pressing the container against the suction cups, and may disengage the container by twisting it.

The assistive pouring device may provide one or more roller legs 60 that are connected to the platform 10, which allows the device to be rolled or tilted while the container is secured on base surface 20 and lateral surface 30. Roller legs 60 may be attached to base surface 20, lateral surface 30, or both surfaces. In the nonlimiting examples shown, the first end of the roller legs 60 are coupled to lateral surface 30, and the roller legs curve under and are coupled to the base surface 20. A first end of the roller legs 60 are curved to allow the assistive pouring device to be rolled, tilted, or rotated. As a nonlimiting example, the first end of the roller legs 60 may be attached to the lateral surface 30. The remainder or second end of the roller legs 60 provides a stable base for the assistive pouring device when the device is in an untilted position. As a nonlimiting example, the remainder of the roller legs 60 may be approximately straight to provide a stable base and may be coupled to the base surface 20. In some embodiments, a bottom portion of roller legs 60 may be made from or coated with a material 70 that is slip-resistant or tacky to prevent or minimize sliding of the assistive pouring device when place on a surface, such as a table top or the like. For example, when the assistive pouring device is placed on a table top, the slip-resistant coating 70 allows the device to be tilted toward the curves of roller legs 60 without sliding along the table top. As nonlimiting examples, the bottom portion of roller legs 60 may be silicon, rubber, latex, polymeric, elastomeric, or the like. In some embodiments, the bottom portion of roller legs 60 may provide a textured surface to increase the slip-resistance of the surface. As a nonlimiting example, the roller legs 60 may provide one or more suction cups, grooves, aggressive textures, or the like.

It should be apparent to one of ordinary skill in the art that the curvature of roller legs 60 influences the amount of force and/or torque that is necessary to tilt the assistive pouring device. As utilized herein, curvature or radius of curvature refers specifically to a curved end of the roller legs and does not apply to the un-curved portions of the roller legs. The radius of curvature of roller legs 60 is preferably selected so that minimal force and/or torque is necessary to tilt the assistive pouring device, thereby aiding ease of use. In some embodiments, the radius of curvature is equal to or between approximately 45 mm to 75 mm (or equal to or between approximately 1.8 to 3.0 inches). In some embodiments, the force require to tilt the device is less than or equal to approximately 2 lbs (or equal to approximately 0.9 kg). In some embodiments, the force require to tilt the device is less than or equal to approximately 1 lbs (or equal to approximately 0.45 kg). In some embodiments, the force require to tilt the device is less than or equal to approximately 0.5 lbs (or equal to approximately 0.23 kg).

The assistive pouring device, such as the platform 10 and roller legs 60, may be made from any material that is suitable for supporting weights up to 20 lbs. In some embodiments, the platform 10 and/or roller legs 60 are formed from a rigid material, such as plastic. As a nonlimiting example, suitable materials may be polymers, plastics, polystyrene, polyvinyl chloride, elastomers, wood, wood laminate, or the like. The platform 10 and/or roller legs 60 may be formed from molding, injection molding, compression molding, thermoforming, extrusion, or the like. In some embodiments, multiple components of the assistive pouring device may be formed simultaneously, such as, but not limited to, the base and lateral surface. Additionally, base surface 20, lateral surface 30, and/or bottom portions of roller legs 60, may be coated with or made from a slip-resistant or tacky coating/ material, such as a silicon, rubber, latex, polymeric, or elastomeric material. Further, in some embodiments, base surface 20, lateral surface 30, and/or bottom portions of roller legs 60 may also or may alternatively provide a textured surface with anti-slip features to increase the slip-resistance of the surface. As a nonlimiting example, the above mentioned textured surface(s) may provide one or more anti-slip features, such as suction cups, grooves, aggressive textures, or the like. The slip-resistant, tacky coating/material, and/or textured surface(s) may be formed on the assistive pouring device in any suitable matter such as, but not limited to, overmolding, dip coating, molding, adhesive bonding, and subsequent attachment to the device. As a nonlimiting example, the slip-resistant surface on platform 10 may be overmolded onto the device, and the slip-resistance surface on roller legs 60 may be molded separately and subsequently snapped into place onto the roller legs. As another nonlimiting example, the platform 10 and roller legs 60 may be formed from a wood laminate, and the slip-resistant surface on platform 10 and/or roller legs 60 may be bonded to them utilizing an adhesive.

Figure 7:
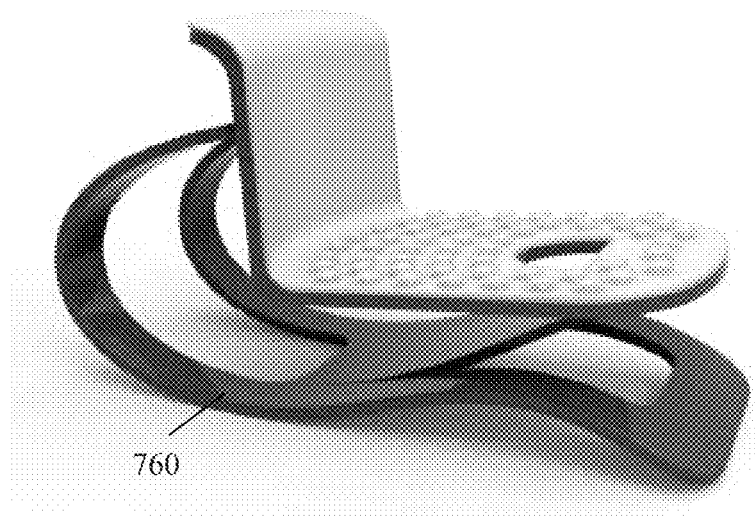
FIG. 7 shows an isometric view of an illustrative embodiment of an assistive pouring device utilizing wood laminates.
Figure 8:
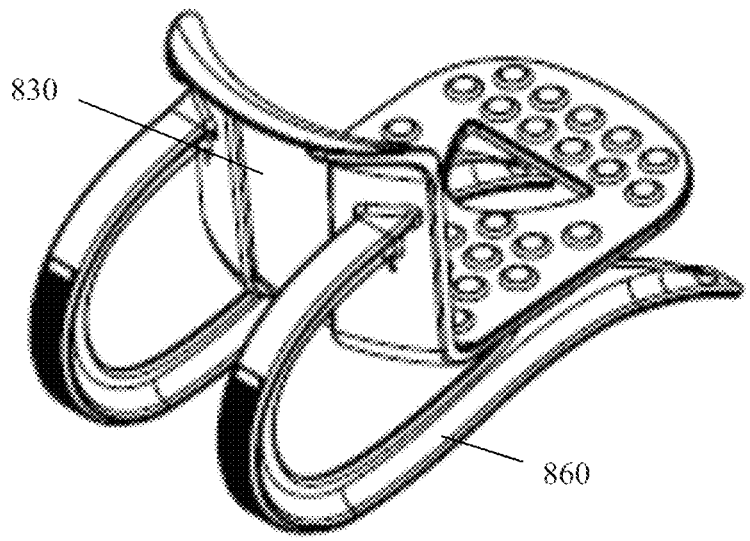
FIG. 8 is an illustrative embodiment of an assistive pouring device utilizing plastic.

As a nonlimiting example, an assistive pouring device made utilizing wood laminates is shown in FIG. 7. This example shares many similarities to the prior embodiments shown. Notably, roller legs 760 may be wide and flat to provide for increased friction that prevents slipping on the surface the assistive pouring device is placed on. FIG. 8 shows an illustrative embodiment of an assistive pouring device made utilizing plastic. As shown, lateral surface 830 may be discontinuous with a slip resistant layer spanning the discontinuous region.

Figure 9A:
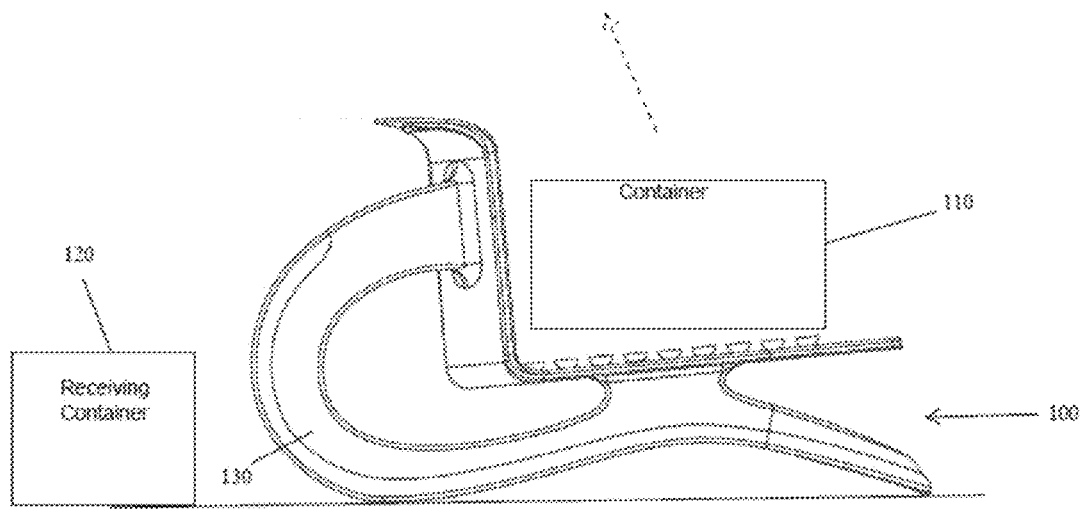
FIGS. 9A-9B show an illustrative embodiment of an assistive pouring device in use.
Figure 9B:
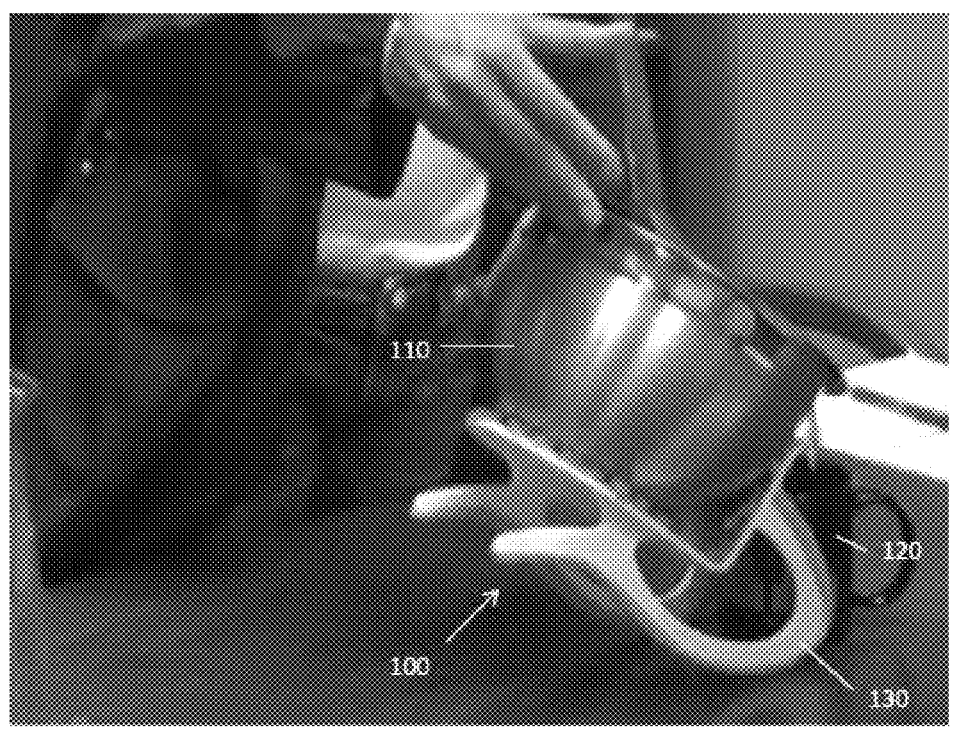

FIGS. 9A-9B illustrate an example of an assistive pouring device in operation. FIG. 9A shows the assistive pouring device 100 placed on a surface, such as a table top or the like. A source container 110 holding a liquid is place on the base surface and lateral surface. A receiving container 120 for receiving the liquid may be placed next to the assistive pouring device 100. As shown by the arrow, assistive pouring device 100 may be tilted or rotated in the direction of roller legs 130 towards the receiving container 120. FIG. 9B shows the assistive pouring device 100 when it has been tilted pour the liquid from container 110 into receiving container 120, whereas FIG. 9A shows the original position of the assistive pouring device 100. In a tilted position, the assistive pouring device 100 rest on the curved portion of roller legs 130. Once a user finishes pouring a desired amount of liquid, the assistive pouring device 100 may be returned to its original position as shown in FIG. 9A. For example, as discussed previously above, the assistive pouring device 100 may receive a container weighing up to 20 lbs, and may only require 2 lbs of force or less to move it into the tilted position. Without the assistive pouring device 100 the user would need to support the weight of the heavy container, as well as grip the container with sufficient force to properly maintain control. This assistive pouring device 100 allows users to avoid the need to support the weight of the heavy container and also avoids the need to exert significant gripping force to control the container while pouring.

EXPERIMENTAL EXAMPLE

The following examples are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

In a test conducted with 4 participants with arthritis, a prototype of the assistive pouring device was tested with different containers varying in weight and shape, including a 1.5 L juice bottle, 1 gallon milk jar, 5 L pitcher, and large bowls. The participants were required to lift the container and place it on the assistive pouring device, use the assistive pouring device to pour water into a cup, and remove the container from the assistive pouring device. The participants were unable to or had difficulty pouring directly from the different containers without the aid of the assistive pouring device.

The results with the aid of the assistive pouring device were positive, and all the participants were able to pour with the assistive pouring device. The 5 liter pitcher was the heaviest testing object, which may even be difficult for a person without arthritis to handle. The 4 participants were able to smoothly pour water from the 5 liter pitcher using the assistive pouring device. The testing demonstrates that persons with arthritis or limited gripping capabilities can utilize the assistive pouring device with ease, including containers that could not previously pour from. The open platform accommodates a wide variety of containers. The 4 participants found the device simple and intuitive to use and well controlled with minimal force. For example, one participant merely needed two fingers to operate the device with a bowl.

Embodiments described herein are included to demonstrate particular aspects of the present disclosure. It should be appreciated by those of skill in the art that the embodiments described herein merely represent exemplary embodiments of the disclosure. Those of ordinary skill in the art should, in light of the present disclosure, appreciate that many changes can be made in the specific embodiments described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure.

The invention claimed is:

1. An assistive pouring device for assisting with pouring liquids from a liquid container, the device comprising:
   a planar base surface positioned approximately horizontal and elevated from a resting surface when the assistive pouring device is in a resting position, wherein the base surface is configured to receive the liquid container and the assistive pouring device keeps the liquid container stationary in the resting position;
   an opening is provided through the base surface for receiving a portion of the liquid container positioned in an angled, nonvertical placement in the resting position, wherein the opening is proximate to front end of the base surface;
   a planar lateral surface coupled to a back end of the base surface, wherein the lateral surface is approximately vertical when the assistive pouring device is in the resting position; and
   at least one-roller leg coupled to the base surface, lateral surface, or both, wherein the at least one-roller legs provides a first end that is curved and a second end that is approximately straight, the first end of the at least one roller leg is coupled to the lateral surface, the at least one roller leg curves under the base surface, and the at least one roller leg is coupled to the base surface.

2. The device of claim 1, further comprising a first slip-resistant coating provided on the base and lateral surfaces.

3. The device of claim 1, further comprising a second slip-resistant coating provided on a bottom portion of the at least one roller leg.

4. The device of claim 1, wherein the base surface, lateral surface, and/or a bottom portion of the at least one roller leg is formed from silicon, rubber, latex, a polymer, or an elastomer.

5. The device of claim 1, further comprising one or more anti-slip features provided on the base or lateral surface, wherein the one or more anti-slip features increases a slip resistance of the base or lateral surface.

6. The device of claim 5, wherein the one or more anti-slip features is a suction cup, groove, or aggressive texture.

7. The device of claim 1, wherein when the assistive pouring device is in the resting position, the base surface is tilted from a horizontal plane at an angle equal to or between 1° to 10°.

8. The device of claim 1, wherein the base surface is contoured to be concave or concave with a flat bottom.

9. The device of claim 7, wherein when the assistive pouring device is in the resting position, an end of lateral surface furthest away from the base surface is tilted away from the base surface at an angle equal to or between 1° to 10°.

10. The device of claim 1, wherein an entirety of the lateral surface is contoured to be concave.

11. The device of claim 1, wherein the lateral surface provides a lip horizontally positioned at a top portion of the lateral surface for supporting the liquid container in the angled, nonvertical placement in the resting position.

12. The device of claim 1, wherein a force require to tilt the device is less than or equal to 2 lbs or 0.9 kg.

13. The device of claim 1, wherein a radius of curvature of the first end of the at least one roller leg is equal to or between 45 mm to 75 mm or 1.8 to 3.0 inches.

14. A method for manufacturing an assistive pouring device, the method comprising:
   forming a planar base surface and a planar lateral surface coupled to a back end of the base surface, wherein the base surface is approximately horizontal and elevated from a resting surface in a resting position and the lateral surface is approximately vertical when the assistive pouring device is in the resting position to keep a container stable in the resting position, the base surface is formed while leaving an opening through the base surface for receiving a portion of the container positioned in an angled, nonvertical placement in the resting position, and the opening is proximate to a front end of the base surface; and
   forming at least one roller leg coupled to the base surface, lateral surface, or both, wherein the at least one roller leg provides a first end that is curved and a second end that is approximately straight, and the first end of the at least one roller leg is coupled to the lateral surface, the at least one roller leg curves under the base surface, and the at least one roller leg is coupled to the base surface.

15. The method of claim 14, wherein the base surface, lateral surface, and/or at least one roller leg are formed by molding, injection molding, compression molding, thermoforming, or extrusion.

16. The method of claim 14, wherein the base surface, lateral surface, and/or at least one roller leg are formed from a polymer, plastic, polystyrene, polyvinyl chloride, elastomers, wood, or wood laminate.

17. The method of claim 14, further comprising forming a slip resistant coating on the base surface, lateral surface, and/or at least one roller leg.

18. The method of claim 14, further comprising forming one or more anti-slip features on the base surface or lateral surface, wherein the one or more anti-slip features is a suction cup, groove, or aggressive texture.

19. The method of claim 17, wherein slip resistant coating is silicon, rubber, latex, polymeric, or elastomeric material.

20. The device of claim 1, wherein the assistive pouring device positions the container at a height on a table top surface that is sufficient to pour into a receiving container positioned on the table top surface.

21. The method of claim 14, wherein the base surface, lateral surface, and the at least one roller leg are formed so that a container positioned on the assistive pouring device is positioned at a height on a table top surface sufficient to pour into a receiving container positioned on the table top surface.

* * * * *